June 16, 1964  C. A. GONGWER  3,137,290
SPACE CAPSULE
Filed April 21, 1958  2 Sheets-Sheet 2
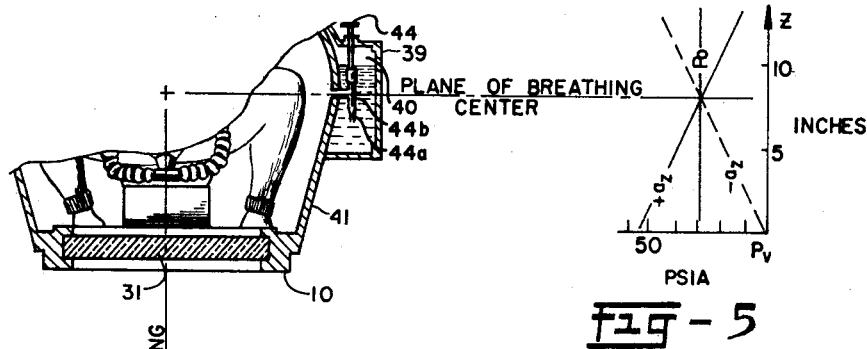
Fig-5
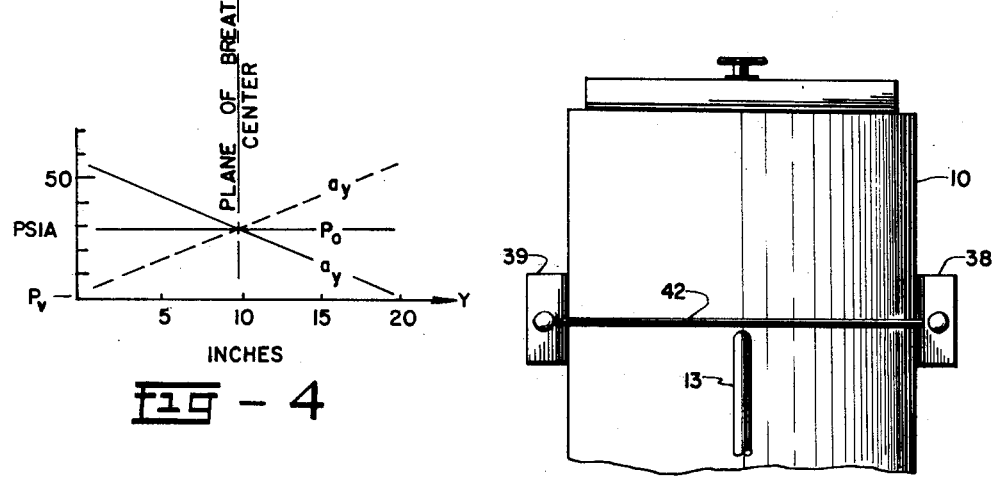
Fig-4
Fig-2a
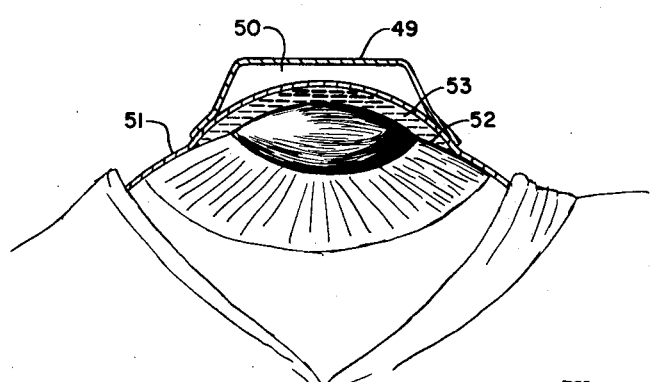
Fig-6
INVENTOR.
CALVIN A. GONGWER
BY
ATTORNEY

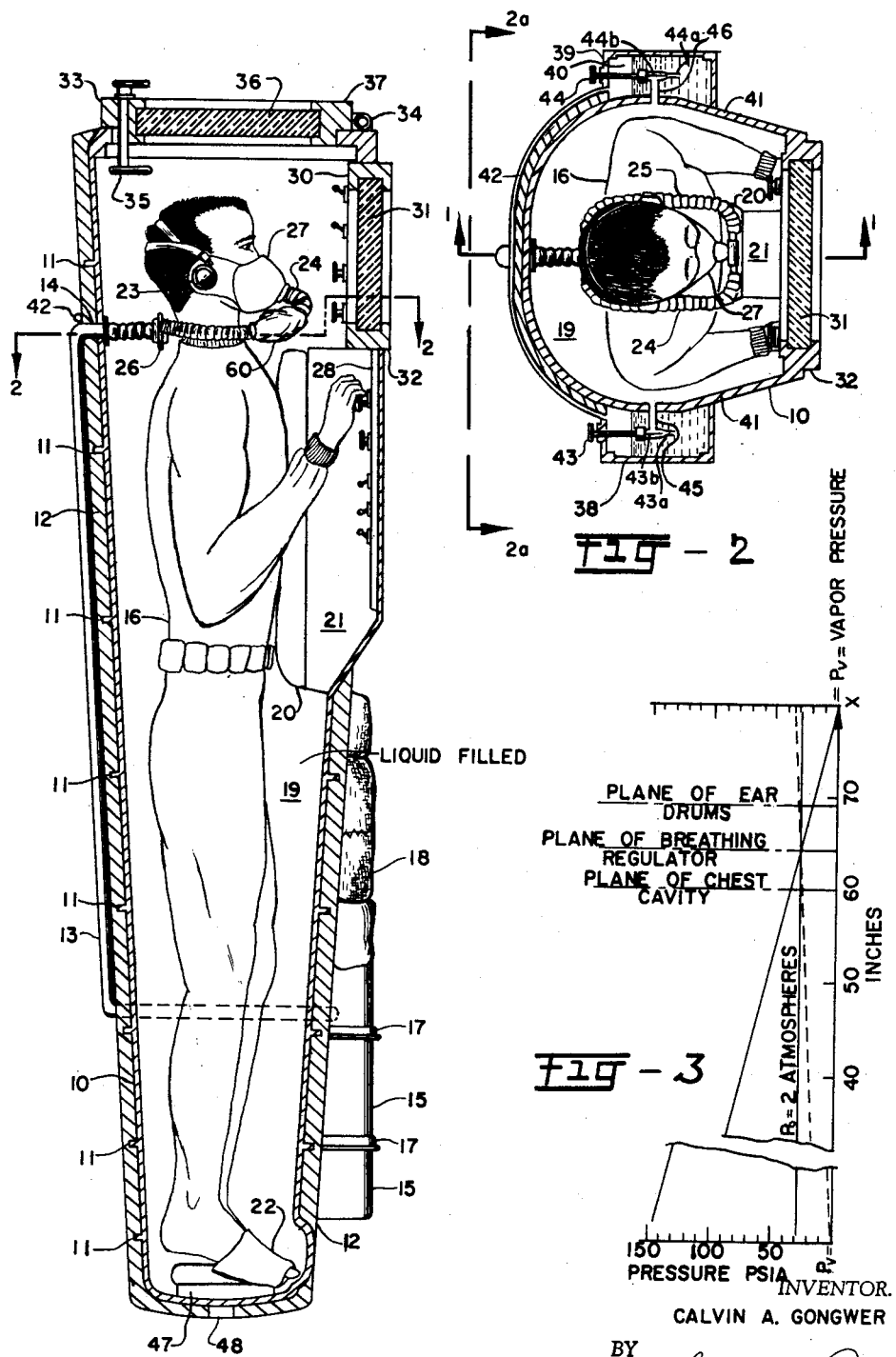

United States Patent Office 3,137,290
Patented June 16, 1964

3,137,290
SPACE CAPSULE
Calvin A. Gongwer, Glendora, Calif., assignor to Aerojet-General Corporation, Azusa, Calif., a corporation of Ohio
Filed Apr. 21, 1958, Ser. No. 730,754
4 Claims. (Cl. 128—1)

This invention relates to means for supporting the human body against distortion effects, and has for an object to provide maximum protection against G's and low pressure for crews of aircraft, manned space ships, or other conveyances for humans.

The human body is substantially non-rigid and therefore requires some type of support to keep eyes, flesh, and body fluids in position relative to other body parts when the body is subjected to very high G's or low pressure. Without well designed support, the non-rigid parts of the body will tend to become distorted, which can result in fatal damage to the body as its parts become displaced. In past art, frequent use has been made of various types of pressurized G suits which generally covered all of the body other than head, neck, hands, and feet. These suits served the purpose very well of conveniently providing body support and protection at lower G's obtained when human conveyances do not have an extremely high rate of change of velocity, or for body support when the external pressures are not extremely low.

The term "G" as used herein denotes what is usually referred to as "G" in connection with accelerations in aircraft and the like; namely, G is a unit of acceleration, one G being equal to 32.2 feet per second per second, which is the acceleration of a freely falling body.

The advancement of aviation has led to the development of rockets and aircraft which, when used for the conveyance of humans, has led to the need for the development of means for supporting the human body under the conditions of the high G's obtained with these conveyances. Travel through space or extremely rarefied atmosphere also requires body support against the low pressure encountered.

The invention is carried out by providing for support of a human body by means of an enclosing rigid fluid-tight capsule which is large enough to substantially surround the body with a protective liquid having a specific gravity near that of the human body, which liquid gives the body hydrostatic support from all directions.

A feature of the invention resides in a gas-filled dome means provided for regulating the pressure at the plane of the breathing center.

A preferred but optional feature resides in conveniently placed windows provided in the wall of the fluid-tight capsule so that an immersed human, who may be the operator of the conveyance carrying the capsule, may, with the aid of suitable contact lenses, correctly view the exterior scene through the immersion liquid adjacent to the eyeballs of the immersed viewer.

These and other features will be more fully understood from the following description and drawings of which:

FIG. 1 shows a side view in cross section of a capsule according to the invention showing an operator within;

FIG. 2 shows a cross section taken at line 2—2 of FIG. 1;

FIG. 2a shows a partial rear view of the capsule taken at line 2a—2a of FIG. 2;

FIG. 3 shows a graph of the equation of pressure variation for G in the "X" direction;

FIG. 4 shows a graph of the equation of pressure variation for G in the "Y" direction for the setting of pressure condition of FIG. 3;

FIG. 5 shows a graph of the equation of pressure variation for G in the "Z" direction for the setting of pressure condition of FIGS. 3 and 4; and FIG. 6 shows an enlarged view of an eyeball of the operator provided with a contact lens for immersed eye correction.

In FIG. 1 there is shown a capsule 10 of any suitable rigid material able to withstand appreciable differences between internal and external pressures. The capsule 10 has circumferential spaced reinforcing flanges 11 protruding outward which gives the capsule 10, composed of a strong metal or the like, added strength. An outer covering 12 of metal, or the like, is provided externally with a suitable oxygen supply conduit means 13 extending through the capsule wall at 14 so as to be arranged in fluid communication with an air or mixed gas supply tank 15 for breathing purposes, which conveniently fills in space adjacent to the capsule 10 containing the thinner leg portions of the body of an operator 16. The air or mixed gas supply tank 15 also has external spaced reinforcing flanges 17 and it is attached as by welding, or the like, to the outer covering 12 of the capsule. A parachute 18 is packed forward of the supply tank 17 and is attached to the outer capsule covering 12 so that, if the capsule is let loose from an aircraft, the capsule parachute 18 will safely carry the capsule to earth. The operator 16 is suspended within the capsule 10 in a suitable liquid 19, preferably water, or some other liquid not harmful to humans. The chest of the operator rests against a fluid-tight padded upper surface 20 of a survival kit 21 contained within the capsule. The feet of the operator rest in stirrups 22 suitably positioned and attached within one end of the capsule.

The operator is also provided with headphones 23 for communication. The headphones may be connected to intercom or radio apparatus by means of wires attached to the flexible breathing tubes 24 and 25 which are attached by a demand breathing regulator 26 to the air or mixed gas conduit 13 and also to a fluid-tight breathing mask 27. The breathing mask is of the type well-known in the art and supplies air to the operator at the breathing center of the capsule and exhausts exhaled gas from the operator. The regulator 26 can be of a well-known type such as is commonly used in diving equipment. Control panels 28 and 30 are conveniently positioned near the hands of the operator on each side, and forward of the survival kit 21 on each side of a window 31. The window 31 is downward and in front of the face of the operator 16 who is shown in a prone position. It is to be understood that other positions of the operator may be used for a somewhat differently shaped capsule, for example, a sitting position. The window 31 is a heavy window which may be of plastic, glass, or the like, and it is sealed in a fluid-tight frame 32 around it which is an integral part of the capsule body. A fluid-tight door 33 having a hinge 34 has a quick opening latch 35 which may be opened from the capsule interior by the operator. The door 33 is for purposes of exit and entry from the capsule 10. A heavy window 36 in a fluid-tight frame 37 is provided in the door 33 to permit the operator to see forward of the capsule.

To keep the breathing of the operator as uniform as possible, the pressure at the breathing center is regulated by domes 38 and 39 in this plane, as shown in FIG. 2, which in operation are filled by gas and partly by the liquid with which the capsule is filled. The gas 40 of the gas-filled domes may be air, or a suitable oxygen mixture. The domes 38 and 39 may be of any convenient shape, as their shape is not important, although partial cylinders of metal, or the like, attached as by welding to the curved wall 41 of the capsule 10 is a strong construction and is the preferred arrangement. Furthermore, for body volume compensation during breathing a bladder 60 is located in the breathing air line to the mask as is usual in aeronautical practice.

The domes 38 and 39 are interconnected by a tube 42 in fluid communication with the fluid volumes 40 within the domes which tends to equalize the pressure between the two fluid volumes 40. Each dome 38 and 39 has valves 43 and 44, respectively, which are variable restrictions 43a and 44a, respectively, variable by a needle valve 43b and 44b, respectively, on the passageway to the capsule. The domes 38 and 39 are interconnected by a line 42 so the pressure is equalized. Passageways 45 and 46, in fluid communication with the valving means 43 and 44, respectively, and subject to the restrictions of the needle valves, pass through the capsule wall 41 and enable the absolute pressure within the capsule 10 to be maintained at a set amount at the plane of the breathing regulator 26, in which plane the passageways 45 and 46 enter the capsule. The pressure of the gas in the domes 38 and 39 should be maintained at about two atmospheres, which pressure is not too high for the operator to stand yet high enough so that the pressure at the low pressure regions of the capsule does not reach the vapor pressure of the fluid during maximum acceleration as will be further explained with respect to FIG. 3. Any suitable means may be utilized to maintain the pressure in domes 38 and 39 at two atmospheres. Besides maintaining the pressure at the breathing center of the capsule at two atmospheres, the gas filled domes 38 and 39 and tube 42 also serve to balance the pressure of the fluid on either side of the operator when the capsule is subjected to acceleration forces in the Y direction as explained further with respect to FIG. 4. In this situation the fluid at one side of the capsule is subjected to an increase pressure while the pressure of the fluid at the opposite side decreases. Balancing of the pressure is permitted by the flow of a very small amount of liquid from said first side of the capsule to one dome, for example dome 38, through needle valve 43, which results in a displacement of the gas in dome 38 to the other dome 39 through tube 42. Due to this displacement of gas some fluid in dome 39 will be forced into the capsule at the opposite low pressure side so that the fluid pressures will be equalized or balanced on each side of the capsule. A valving means 47 and a plug 48 are provided at the foot end of the capsule 10 for the purpose of permitting filling of the capsule with liquid 19 after the entry of the operator into the capsule.

FIG. 6 shows an eye contact lens 49 for immersed eye correction which is used by an operator in the capsule 10 to correct distortion of vision due to the liquid 19. The lens 49 has a trapped air volume 50 between the lens 49 and a lens structure 51 curved on the periphery to fit the eyeball 52. A saline solution 53 separates the eyeball from the lens structure 51. It is to be understood that any suitable lens arrangement other than this type lens could also be used by an operator 16 within the capsule 10, although this lens is preferred.

In the graphs of FIGS. 3, 4, and 5, the pressure variations for positive and negative acceleration, plus "a" and minus "a," respectively, are depicted with respect to the positive X, Y and Z directions, respectively. The plus X direction is taken from the foot end of the capsule to the head end of the capsule, the plus Y direction from the right arm side to the left arm side of the downward facing operator within the capsule, and the plus Z direction from the chest side to the back side of the downward facing operator.

Under the acceleration the pressure in the plane of the air domes remains at two atmospheres absolute reference pressure. Therefore in order to satisfy the requirement that the fluid experience a pressure gradient in the direction of the applied acceleration, the pressure of the fluid at one end of the capsule must decrease below the reference pressure, while the pressure in the fluid at the other end of the capsule undergoes an increase in pressure above the reference pressure. The limiting value of the pressure gradient is reached when the pressure at the extreme end of the capsule reaches the vapor pressure of the fluid. For pure water at 60° F., this value would be 0.30 p.s.i.a. and any further increase in acceleration would cause the fluid in the low pressure end to "boil." At this point the equilibrium of this system is altered and the plane of constant pressure is destroyed.

In FIG. 3, the pressure variations within the capsule in the X direction are shown on the plus "a" curve when there is the maximum permissible acceleration forward in the X direction. At the head end of the capsule the pressure is that of the vapor pressure of the liquid, or 0.30 p.s.i.a. The pressure gradient increases rearward through the plane of the eardrums, the plane of the breathing regulator where the pressure is maintained at about 29.4 p.s.i.a., and the plane of the chest cavity in substantially a straight line graph variation to the foot end of the capsule, where the pressure is about 150 p.s.i.a.

The maximum positive acceleration is 81.0 G assuming the distance of 10 inches from the plane of the domes 38, 39 and breathing regulator 26 to the forward end of the capsule adjacent the door 32. It is also assumed that the liquid 19 is pure water and it is noted that the vapor pressure is 0.30 p.s.i.a. for pure water at 60° F. The maximum acceleration is equal to the change in pressure times the gravitational force over the distance times the density of the liquid and in this case the calculation is 81.0 G. The change in pressure is 29.10 p.s.i.a. The maximum negative acceleration is 13.4 G assuming a distance of 5.0 feet from the plane of the air domes and breathing regulator to the aft end of the capsule adjacent the valve 47. The maximum permissible minus "a" pressure gradient graph extends from vapor pressure of 0.30 p.s.i.a. at the foot end of the capsule through 29.4 p.s.i.a. at the controlled pressure at the plane of the breathing regulator to about 35 p.s.i.a. at the head end of the capsule.

In FIG. 4 for the Y direction, the maximum permissible plus "a" and minus "a" pressure gradients extend from vapor pressure through about two atmospheres' pressure at the plane of the breathing center to about 55 p.s.i.a. on the opposite interior side of the capsule. The maximum acceleration in the Y direction is 85 G. It is noted that due to the orientation of the force vector, the fluid no longer remains in the static equilibrium, but experiences a displacement from one dome to the other. This fluid displacement creates a pressure gradient in the Y direction of the capsule that is determined by the controllable restriction in the passages into both domes. The maximum acceleration that can be experienced in this direction is again dependent upon the limiting slope of the pressure gradient curve that will allow the fluid to approach the vapor pressure at one side of the capsule and pass through the reference pressure of two atmospheres absolute at the midpoint of the capsule. In this manner the pressure gradient curve will be symmetrical about the plane of zero pressure fluctuations. It is assumed that a distance from the side of the capsule to the plane passing midway between the ears and lungs or one-half of the capsule width is .79 foot.

In FIG. 5, for the Z direction, the maximum permissible plus "a" and minus "a" pressure gradients extend from vapor pressure through about two atmospheres at the plane of entry of the passageways 45 and 46 (which are both the same Z plane) to about 55 p.s.i.a. on the opposite interior side of the capsule. For accelerations in the Z direction, the lungs and ears are now in the same plane normal to the acceleration vector and by proper body positioning, can be made within an inch of the plane of zero pressure fluctuations which is now horizontal or in the X—Y plane. The same principle of inertia hydrostatics hold true in this direction as it did in the X direction. Assuming that the distance from the bottom of the capsule to the plane of the chest and ears or one-half of the capsule depth is 8 inches, the maximum acceleration is 102 G.

In FIG. 3 it can be seen that the pressure at the plane of the chest cavity and at the plane of the eardrums does not vary extreme amounts from the two atmospheres of pressure at the plane of the breathing regulator. Furthermore, the pressure is not above 80 p.s.i.a. on the body of the operator except on the substantially solid body areas of the legs within the approximately forty inches of the foot end of the capsule.

It is thus seen that the capsule device of this invention provides for hydrostatic support for the body against G by putting the body in a closed tank of water or similar liquid of specific gravity near that of the body. The pressure at the breathing center, where a demand breathing regulator is provided, is regulated by the gas-filled domes 38 and 39 in this plane, which are properly maintained at about two atmospheres pressure. Without acceleration, the entire volume of liquid 19 is regulated at two atmospheres of pressure by the position of the needle valves 43, 44. While under acceleration of a magnitude that subjects the capsule to the absolute pressure shown in FIGURE 3, the pressure varies as the straight line function of the distance from the plane of the breathing regulator. FIGURE 3, illustrates the change in pressure of the liquid in various depths of the capsule when the direction of flight is in the X direction (the head end of the capsule). For vision correction, eye contact lenses are used. Thus, water supports the face, eyes, flesh, and body fluids against very high G's. Since body blood and tissue have substantially the same specific gravity as the supporting liquid in the capsule, there is no distortion effect on the flesh or tendency of the blood to migrate. With this immersed body arrangement, higher G's than ever before can be sustained without extreme discomfort, harm, or loss of efficiency of the human body subject to such high G's.

It is to be understood that controls for operating the airplane, or the like, on the control panels 28 and 30 are connected by quickly detachable means to the aircraft so that the entire capsule 10 may be parachuted in an emergency by means of the capsule parachute 18.

The airdomes are shown as appendages on the capsule 10 in the preferred embodiment, although it is to be understood that ullage space may be provided within the capsule as well. Furthermore, the capsule 10 may be of a different shape, such as spherical; and it may, if desired, be rotatable to the expected G direction to enable the contained operator to be affected in the same way by the same magnitude G in any direction.

While a preferred embodiment of the invention has been shown and described, it is my desire that the invention shall not be limited except in accordance with the appended claims, since persons skilled in the art may devise other embodiments still within the limitations of said clams.

I claim:

1. Structure for containing a human protected hydrostatically against high G's or low pressure comprising: rigid capsule means having a cavity adapted for containing said human; said capsule means having a center of breathing therein; a fluid of average human body density disposed within said capsule cavity; means positioned for supplying life-sustaining gas for breathing to said center of breathing upon demand and for removing exhaled gas produced by breathing from said center of breathing; means responsive to an accelerating condition for equalizing pressure between two sides of said cavity to maintain substantially constant pressure at said center of breathing; and means in said capsule means to compensate for body volume changes during breathing.

2. A structure for containing a human protected hydrostatically against high G's or low pressure comprising: a fluid-tight rigid capsule having an interior cavity; a liquid filling said capsule of substantially the average density of the human body; said capsule having a center of breathing therein; means for providing a supply of life-sustaining gas for breathing upon demand to said center of breathing, and for exhausting exhaled gas from said center of breathing; means responsive to an accelerating condition for equalizing pressure between two sides of said cavity to maintain substantially constant pressure at said center of breathing; and means in said capsule to compensate for body volume changes during breathing.

3. A rigid structure for containing a live human protected hydrostatically against high G's or low pressure comprising: a fluid-tight rigid capsule having a closed interior cavity; a liquid filling said capsule of substantially the average density of the human body; said capsule having a center of breathing therein; means for providing a supply of life-sustaining gas for breathing upon demand to said center of breathing, and for exhausting exhaled gas from said center of breathing; means responsive to an accelerating condition for equalizing pressure between two sides of said cavity to maintain substantially constant pressure at said center of breathing; and means in said capsule to compensate for body volume changes during breathing.

4. A rigid structure as set forth in claim 3, in which said means responsive to an accelerating condition for equalizing pressure between two sides of said cavity to maintain substantially constant pressure at said center of breathing comprises two gas-filled domes, each having fluid communication to a respective interior side of said capsule cavity at a similar position on its respective side, said fluid communication being at the breathing center position of said live human contained within said capsule cavity.

References Cited in the file of this patent

UNITED STATES PATENTS

| 1,068,433 | Karamanos | July 29, 1913 |
| 2,228,115 | Holste | Jan. 7, 1941 |
| 2,335,474 | Beall | Nov. 30, 1943 |

FOREIGN PATENTS

| 528,407 | Great Britain | Oct. 29, 1940 |